United States Patent
Lapointe

[19]

[11] Patent Number: 6,159,361
[45] Date of Patent: Dec. 12, 2000

[54] OIL-RECLAIMING BOUYANT APPARATUS

[76] Inventor: Bernard Lapointe, 1655 Léger, Trois-Rivières Québec, Canada, G8Y 3C7

[21] Appl. No.: 09/289,757

[22] Filed: Apr. 12, 1999

Related U.S. Application Data

[63] Continuation-in-part of application No. 09/000,871, Dec. 30, 1997, abandoned.

[51] Int. Cl.[7] ....................................................... C02F 1/40
[52] U.S. Cl. .................. 210/121; 210/242.2; 210/242.3; 210/258; 210/521; 210/532.1; 210/923
[58] Field of Search ..................................... 210/801, 802, 210/803, 121, 242.1, 242.2, 242.3, 252, 258, 521, 522, 532.1, 923

[56] References Cited

U.S. PATENT DOCUMENTS

| | | |
|---|---|---|
| 2,025,883 | 12/1935 | Mobley . |
| 2,678,699 | 5/1954 | Fowler . |
| 3,529,728 | 9/1970 | Middelbeek . |
| 3,669,271 | 6/1972 | McGivern . |
| 3,670,896 | 6/1972 | Hale, Jr. et al. . |
| 3,745,115 | 7/1973 | Olsen . |
| 3,762,548 | 10/1973 | McCabe . |
| 3,890,234 | 6/1975 | Galicia . |
| 3,915,864 | 10/1975 | Massei . |
| 3,933,654 | 1/1976 | Middelbeek . |
| 3,992,297 | 11/1976 | Baughcom et al. . |
| 4,115,279 | 9/1978 | Toft . |
| 4,122,016 | 10/1978 | Tao et al. . |
| 4,132,651 | 1/1979 | DeJong . |
| 4,144,170 | 3/1979 | Dunkers . |
| 4,554,074 | 11/1985 | Broughton . |
| 4,664,802 | 5/1987 | Lee . |
| 4,802,592 | 2/1989 | Wessels . |
| 4,851,133 | 7/1989 | Rymal . |
| 4,960,347 | 10/1990 | Strange . |
| 5,066,407 | 11/1991 | Furlow . |
| 5,154,835 | 10/1992 | DeMichael . |
| 5,216,974 | 6/1993 | Gordon, Sr. . |
| 5,405,538 | 4/1995 | Batten . |
| 5,411,665 | 5/1995 | Scraggs et al. . |
| 5,520,825 | 5/1996 | Rice . |
| 5,527,461 | 6/1996 | Hill . |
| 5,560,826 | 10/1996 | Szereday et al. . |
| 5,601,705 | 2/1997 | Glasgow . |
| 5,814,213 | 9/1998 | Glasgow . |

FOREIGN PATENT DOCUMENTS

| | | |
|---|---|---|
| 0 282 906 | 9/1988 | European Pat. Off. . |
| 195 17 432 C1 | 8/1996 | Germany . |

*Primary Examiner*—David A. Simmons
*Assistant Examiner*—Fred Prince
*Attorney, Agent, or Firm*—Francois Martineau

[57] ABSTRACT

An oil separating buoyant surface vessel for separating oil from surface water level from a large body of oil-contaminated water and for economically reclaiming this oil The vessel comprises a pair of lateral buoyancy members and a liquid flow-through separator rigid open frame integral to the buoyancy member and destined to be maintained in partly submerged condition in water. The separator frame comprises a first chamber having a front surface water intake port, and a pair of first channel members extending to a rear surface water outlet port; a second chamber located rearwardly of the first chamber; a third submerged chamber located beneath the first and second chambers and having a second channel member, extending to a front submerged water outlet port, a third arcuate channel member, an intermediate section of the third channel member extending spacedly over water line, and a fourth upright channel member, opening at its top end mouth into the second chamber over water line. Pressurized air is fed to a submerged rearward end portion of the first channel member, wherein a fore and aft suction is generated into the first channel member.

17 Claims, 10 Drawing Sheets

OIL-RECLAIMING BOUYANT APPARATUS

CROSS REFERENCE DATA

This is a Continuation-In-Part patent application of parent patent application No. 09/000,871 filed Dec. 30, 1997, now abandoned.

FIELD OF THE INVENTION

This invention relates to the field of clean-up treatment of a large body of water following a contaminant oil spills.

In particular, the invention relates to a buoyant vessel adapted to operate in stationary fashion at the water level of a large body of oil-contaminated water, to collect the oil/water solution, to separate the oil from the water, to reclaim the separated oil by redirecting the latter to a storage tank, and to return the separated water to the large body of water.

BACKGROUND OF THE INVENTION

A number of apparatuses have been devised in the prior art to address the problem of oil spills that affect large bodies of water such as oceans and lakes. Such oil spills may be the result of accidental release of hydrocarbons from a line leakages from multitude of motorboats, or of large ocean going oil tanker vessels that run aground and with their hull rupturing and thus releasing to the environment their biotoxic content. Since oil has a lower specific density than water, it will automatically rise to the top of the contaminated body of water, and will remain so as a surface oil film. Therefore, the prior art oil decontamination apparatuses are usually directed at collecting the surface liquid film from the body of water, and proceeding afterwards to a gravity phase separation of oil and water inside separation chambers, so as to separate the two components into an oil rich solution and a water rich solution. These two separated solutions can then be further processed for possible economic reclaiming, or at least for meeting environmental regulations that enable authorized release to the environment of the water rich solution and reuse of the oil rich solution for low grade economic oil applications.

An example of such an apparatus is U.S. Pat. No. 5,527,461 issued in June 1996 to the Canadian Gordon Hill, discloses an apparatus for separating an oil film from a body of water on which it is floating. The apparatus comprises a main inner chamber having an inlet in register with the surface of the contaminated body of water. A riser is mounted centrally of the main chamber, having a bottom mouth spaced from the main chamber flooring. Vertical baffles extend around the riser inside the main chamber. The contaminated water enters the main chamber and the oil and water components thereof are subjected to a preliminary gravity separation due to their differential densities. The baffles enhances this gravity separation of the oil from the water, by first directing the flow down toward the mouth of the riser, and then directing the flow upward to a second separation zone, and finally downwards once again to the entrance of the riser. A bottom compressed air nozzle is thus provided beneath the bottom mouth of the riser, for injecting gas bubbles into the apparatus so that small slugs of oil in the water are attracted to and become attached to the air bubbles. At the surface of the riser, the bubbles burst and the oil is released to agglomerate with the other slugs being released at the top. The oil, water and slurry at the top of the riser is withdrawn through an outlet port at the top of the riser. The thick layer of oil having accumulated over the body of water inside the main chamber, is removed therefrom using oil recovery lines having their oil intakes positioned at the oil layer surface.

There are two major problems with such an oil spill treatment apparatus:

a) it does not appear possible to prevent at least some water from the top oil rich layer inside the apparatus main chamber, from engaging into the oil recovery lines, since the physical interface between this oil rich layer and the underlying body of water is not clear cut. A progressively increasing proportion of water will be found in this top oil layer as the oil layer is progressively depleted by suction action of the oil recovery lines.

b) it would not further appear possible to stop the suction action of the oil recovery lines, when the oil rich layer has been totally removed from the main chamber, otherwise than manually by an operator continuously inspecting the situation via sensors positioned inside the apparatus. No means for automatically shutting off operation of the oil recovery lines appear possible in this type of system, when the oil spill has been clean-up, thus reducing the economical value of the collected oil.

Accordingly, economic reclaiming of the oil component from the contaminated body body of water, would not appear to be efficiently carried out in prior art oil spill cleanup apparatuses.

Some of these prior art oil spill clean-up apparatus references also make use of the communicating vessels principle in enhancing the gravity separation of the oil from the water through tubes interconnecting two separate chambers: see for example U.S. Pat. No. 5,560,826 issued in October 1996 to the Hungarians Szereday and Toth.

Furthermore, many of these prior art references require on board motor driven propellors, in view of moving the apparatus about the water and/or to enable water and oil flow through the apparatus for drawing in the contaminated water surrounding the apparatus; these high speed propellers are safety hazards for maintenance crews. Some however do provide for safer compressed air lines that generate air bubbles, to continuously maintain a suction induced contaminated water flow through the apparatus from the large body of water: see for example the Hill patent, supra.

OBJECTS OF THE INVENTION

The gist of the invention is therefore to substantially improve upon the economic reclaiming of oil from the operation of a decontamination buoyant apparatus for clean-up of surface oil spill on a large body of water, by completely separating recovered oil from water and by automatically stopping operation of the apparatus once the large body of water has been completely cleaned-up.

A corollary object of the invention is to provide such a buoyant vessel, which will be able to discriminate oil from water during decontamination of a body of water, so as to reclaim 100% pure oil in a storage tank and to automatically shut itselfout once the body of water has been completely decontaminated, wherein water is never mixed with the reclaimed oil, while no human intervention is required.

An important object of the invention is to provide such an oil-reclaiming buoyant apparatus, which operates automatically, stationary over water, and is substantially maintenance free, and is very reliable due to the small number of movable parts.

A corollary object of this invention, is to reduce to operating costs of oil reclaiming apparatuses.

A further object of the invention is to provide an oil reclaiming vessel for clean-up of oil spills on the surface of lakes and oceans, which vessel is very safe for the technical maintenance crew since it has no moving parts that could constitute a bodily hazard, and which is very easy to install, to operate, and to maintain by semi-skilled labour.

SUMMARY OF THE INVENTION

In accordance with the objects of the invention, there is disclosed an oil reclaiming device for use on the surface of a main body of oil contaminated water, said device comprising: a) a first front collection chamber, having a top contaminated water surface intake port, a rearwardly upwardly inclined flooring, and a submerged first water outlet; b) a second waterless oil accumulation chamber, located rearward from said first chamber, and having an access for economic oil reclaim outside of said device; c) a third submerged separation chamber located beneath said first and second chambers and having a second water outlet; d) a first overflow and communicating vessels tubular assembly, fluidingly interconnecting said first and third chambers; e) a second overflow tubular assembly, fluidingly interconnecting said second and third chambers; and f) a powered fluid flow system for providing continuous front to rear liquid flow through said device; wherein water is prevented from engaging into said second chamber, both during oil clean-up of the main body of water and after clean-up thereof has been completed, so that waterless oil can be reclaimed from said second oil accumulation chamber at all stages of operation of said device.

The invention also relates to an oil separating buoyant surface vessel for separating oil from surface water level from a large body of oil-contaminated water and for economically reclaiming this oil, said vessel destined to operate in stationary fashion on the water surface and comprising at least one buoyancy member and a liquid flow-through separator rigid open frame integral to said buoyancy member and destined to be maintained in partly submerged condition in water, said separator frame comprising:

a first oil contaminated collection chamber having a front surface water intake port, a rearwardly upwardly inclined submerged flooring, and at least one first channel member extending to a rear surface water outlet port for free water flow between said water intake port and said rear water outlet port:

a second oil accumulating waterless chamber located rearwardly of said first chamber;

a third submerged separation chamber located beneath said first and second chambers and having a second channel member, extending to a front submerged water outlet port, a third arcuate channel member, extending through said inclined flooring into said first chamber for fluid communication between said first and third chambers, an intermediate section of said third channel member extending spacedly over water line, and a fourth upright channel member, extending through said inclined flooring and opening at its top end mouth into said second chamber for fluid communication between said second and third chambers, said top end mouth of said fourth channel member being located spacedly over water line;

a pressurized air line, coupled to a power source and feeding pressurized air to a submerged rearward end portion of said first, channel member, wherein a fore and air suction is generated into said first channel member, said fore and aft suction generating and maintaining water flow from the large body of contaminated water, through said front water intake port and into said first chamber, through said first channel member and outwardly through said rear water outlet port; and an upright overflow tank, having a closed bottom end extending through and beyond said inclined flooring, and a top open mouth extending at water line, with one leg of said third arcuate channel member extending through said upright tank top open mouth and into said upright tank, said third channel member one leg defining a bottom mouth located beneath said first chamber inclined flooring;

wherein under the communicating vessel principle, oil rich water overflow occurs between said first chamber and said upright tank through said upright tank top mouth, and oil overflow occurs between said fourth channel member and said second chamber through said fourth channel member top mouth;

said second chamber having an access area for collecting the oil accumulating therein; wherein once the large body of water has been decontaminated, liquid overflow automatically stops between said fourth channel member and said second chambr, so that accidental entry of water into said second chamber is positively prevented through operation of said oil separating vessel.

Preferably, there is further included a second pressurized air line, coupled to a power source and extending through said upright tank top mouth and into said third channel member one leg short of said third channel member bottom mouth; wherein said second pressurized air line generates a fore and air suction into said third channel member, the latter fore and aft suction accelerating oil rich water flow from said upright tank into said third chamber and also accelerating water outflow from said third chamber to said front water outlet port.

A buoyant planar gate may be mounted for relative movement to said front surface water intake port, said buoyant gate accelerating oil rich water flow through said front water intake port to said upright tank top mouth. An adjustable weight member could then be added, being carried by said buoyant planar gate for adjusting the relative orientation of the planar gate depending on the selected water flow rate generated by said first pressurized air line.

Preferably, a second front water outlet port is provided, opening into said first chamber adjacent the front end of said first chamber inclined flooring, and an elbowed pipe member, coupled at its inner end to said second water outlet port, and extending in submerged condition and opening at its opposite outer end mouth to water line, said elbowed pipe member outer end mouth being located spacedly ahead of and in register with said front surface water intake port.

It is envisioned for improved efficiency to include a lift and force air pump, mounted to said open rigid vessel frame and coupled to a pressurized air supply power source, an oil intake hose, connected at its inner end to said pump and its bottom end mouth opening into a lower section of said second chamber, and an oil discharge hose, fluidingly interconnecting said pump to a remote oil reclaiming location, wherein oil in said second chamber is removed therefrom and propelled outwardly from said surface vessel to the remote oil reclaiming location.

Alternately or concurrently with the lift and force pump, there may be addeda remote suction air pump and an oil intake hose member, extending through said second chamber and fluidingly interconnecting said second chamber to a remote oil reclaiming location, wherein oil in said second chamber is removed therefrom and propelled outwardly from said surface vessel to the remote oil reclaiming location.

Preferably, an oil level float ball and trip lever assembly is fitted to the present oil separator vessel, being operatively connected to said lift and force pump and sensitive to oil level variations in said second chamber for cyclical on/off operation of said lift and force pump responsively to fluctuations of oil levels between lower and upper oil level limits further including a filter basket, mounted into said second chamber intermediate said oil intake hose bottom end mouth and said fourth channel member top end mouth.

It would be advantageous to add a filter basket, mounted into said second chamber intermediate said oil intake hose bottom end mouth on the one hand, and said fourth channel member top end mouth and said suction air pump oil intake hose member inner end mouth on the other hand.

Moreover, an air line control box would be useful, operatively connected to said pressurized air lines and to said pumps air supply power source, for coordinating the operations thereof.

For optimum performance, there could be added two said buoyancy members carried on opposite sides of said main rigid open frame, the front end of each said buoyancy member being inwardly bevelled, so that a front funnel shape jaw is formed by the front ends of said buoyancy members; wherein water whirpool effects are generated ahead of said surface vessel by the suction borne fore and aft water flows generated by said pressurized air lines, which accelerates the oil spill clean-up required time line. These buoyancy members could then be pivotally mounted to said main rigid frame for pivotal motion between an extended operative condition, extending along the water ligne away from said main rigid frame for oil separation operations, and a retracted inoperative condition, extending against said main rigid frame for moving about said vessel on the surface when not in operation.

Preferably, a buoyant collar member is slidingly carried around the top end mouth of said upright tank, said collar member being rearwardly bevelled with a front raised wall, in register with said buoyant planar gate and extending above water line, and a rear depressed wall, opposite said front raised wall and extending slightly below water line.

DETAILED DESCRIPTION OF THE PREFERRED EMBODIMENT OF THE INVENTION

Figure 1:
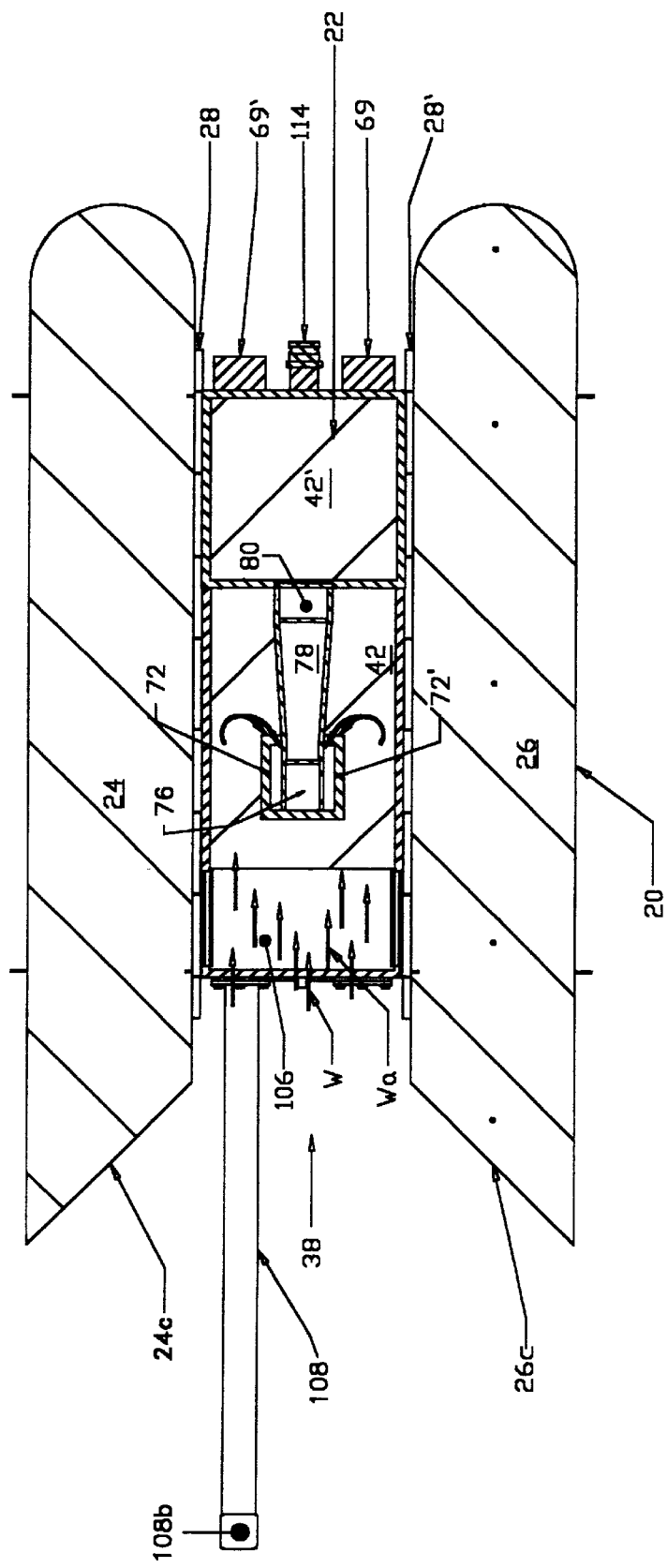
FIG. 1 is a top plan view of an oil spill clean-up water vessel according to a preferred embodiment of the invention, showing the pair of lateral floats in their horizontally extended water vessel stabilizing condition.

The vessel illustrated in FIGS. 1–4 of the drawings, as reference 20, includes a main open box-like frame 22 and a pair of integral elongated flat buoyancy members 24, 26, wherein vessel 20 is adapted to engage and to float at the water level L1 of a large body of water W. Floats 24, 26 are more particularly pivotally mounted along the inner edges thereof 24a, 26a, to the upper lateral side edge portions 30a, 32a of the intermediate frame 22, by piano hinge mounts 28, 28', for relative pivotal motion of the floats 24, 26 between a water vessel stabilizing condition shown in FIGS. 1 and 2, in which the floats extend away from the main frame 22 and substantially along the water level L1, and the alternate condition shown in FIG. 3, where the floats are downwardly retracted and come to abut against the opposite lateral side walls 30, 32 of the main frame 22. Preferably, link chains 34, 36, interconnect brackets at the lower lateral side edge portions, 30b, 32b, of the intermediate frame 22 to the ears at the outer edges 24b, 26b of the floats 24, 26, to prevent accidental pivotal motion of the floats upwardly beyond their water line level shown in FIG. 2. Preferably also, and as clearly illustrated in FIG. 1, the front ends 24c, 26c of the floats 24, 26, are interiorly bevelled, to constitute in combination a funnel shape jaw 38 at the front end of the vessel 20.

Figure 2:
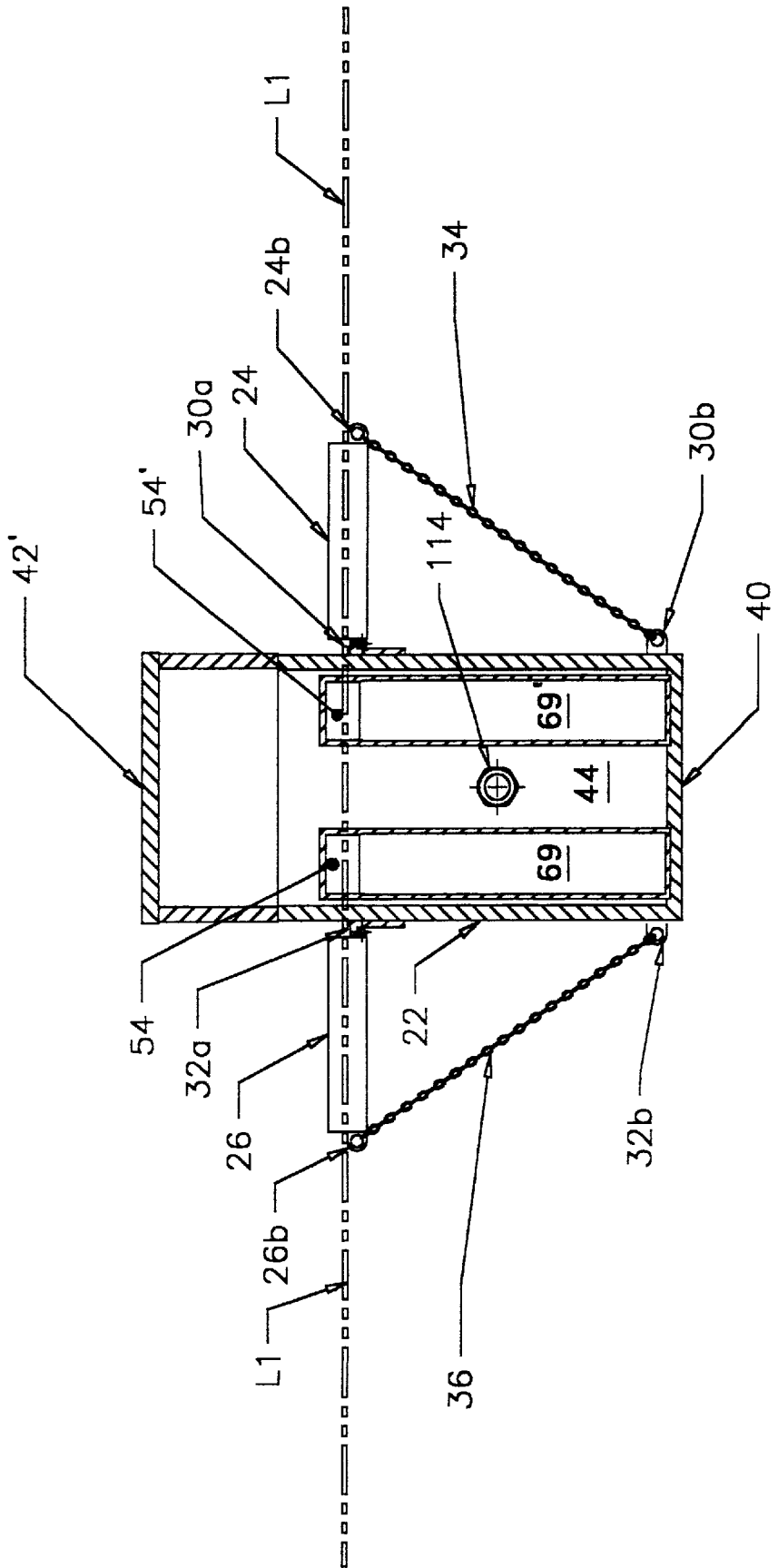
FIG. 2 is a rear elevational view of the vessel of FIG. 1, with respect to the water line of the large body of water.
Figure 3:
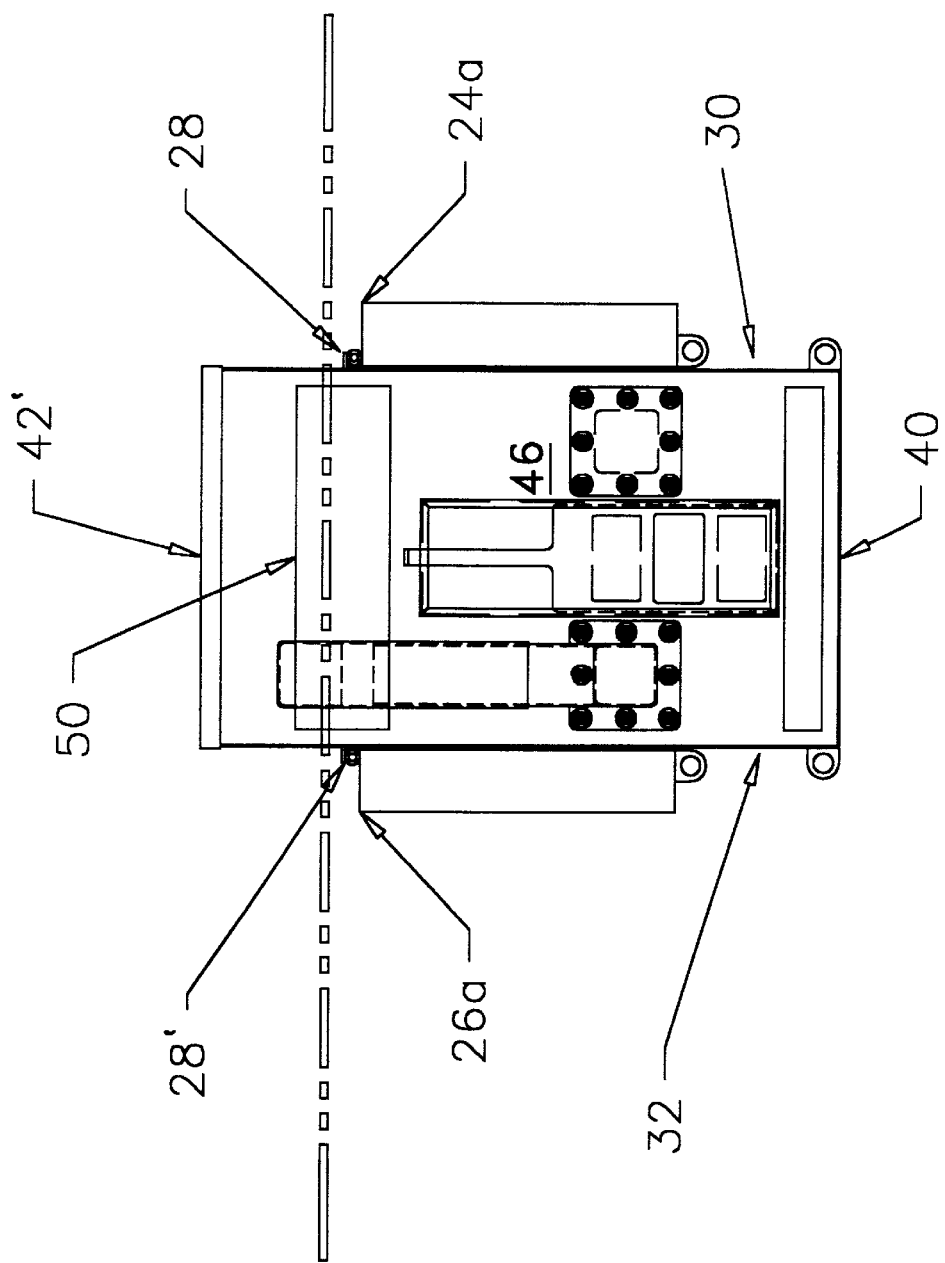
FIG. 3 is a front elevational view of the vessel of FIG. 2, but with the pair of lateral floats being pivoted to their vertically extended condition where they still provide buoyancy but do not provide water vessel stabilization.
Figure 4:
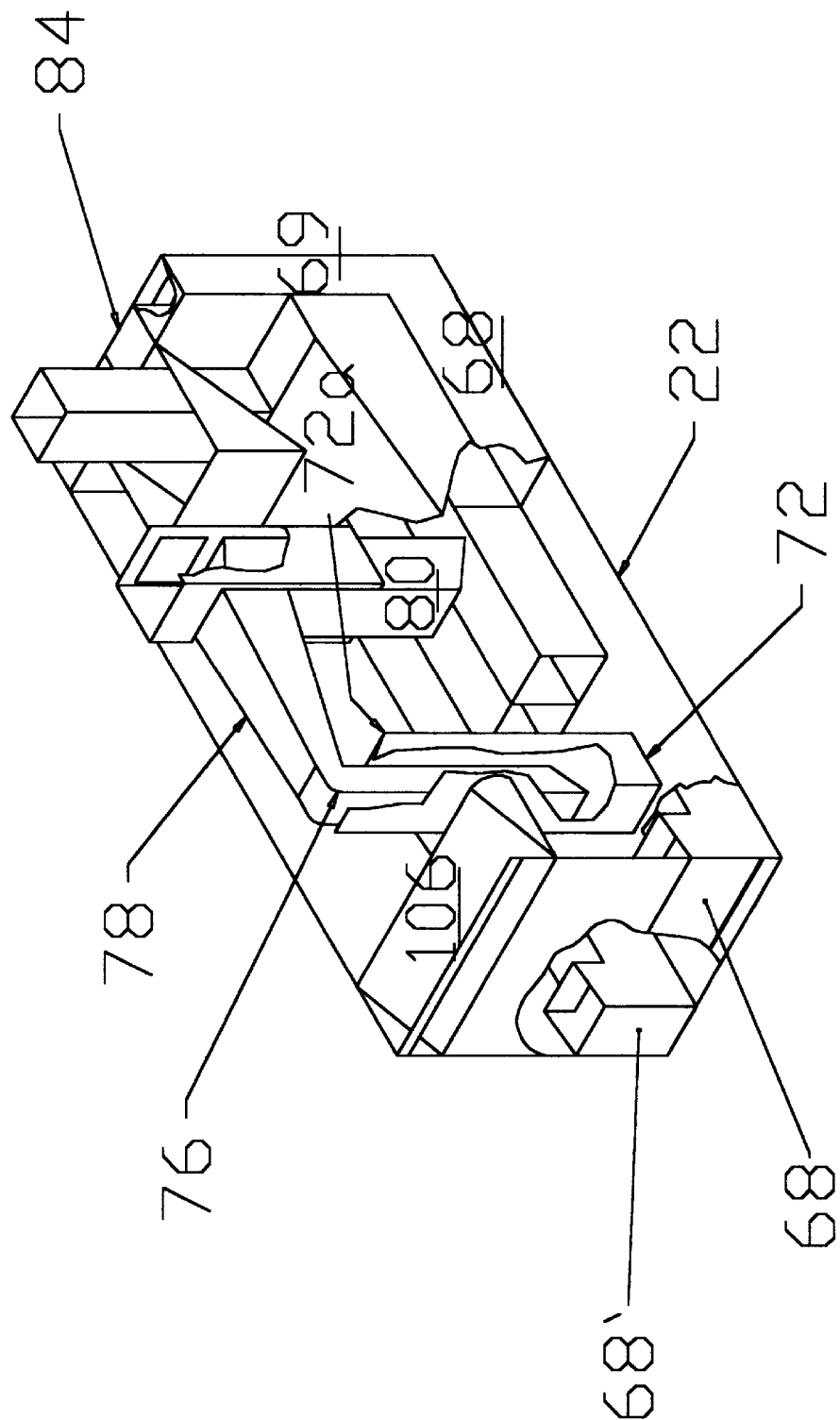
FIG. 4 is a partly broken, isometric view of this water vessel, but with the lateral pontoons being removed for clarity of the view.

It is noted from inspection of FIGS. 2 and 3, that as the floats pivot respectively between their two limit positions, the water line of the vessel relative to the water level L1, remains substantially unchanged, i.e. slightly above hinges 28, 28'.

The oil/water separating elements in the main frame 22 will now be detailed, having reference in particular to FIGS. 4–10 of the drawings. We will use the following terminology to clarify hereinbelow the liquid water/oil component identifications:

a) the "solution" will be a mixture of oil and water;
b) a "water-rich solution" will be a mixture of oil and water where water remains as the main liquid component;
c) an "oil rich solution" will be a mixture of oil and water where oil is the main liquid component;
d) the "water" will be a solution substantially free of oil, but with noticeable trace amounts of oil remaining
e) the "oil" will be a completely pure hydrocarbon solution with positively no remaining amount of water.
f) the "large body of water" will be a lake or ocean having a top oil layer of a thickness which may vary depending on the extent of the oil spill.

Whenever we will talk of water and oil and their relative interaction through the present separating apparatus, it will be meant not to be limited to these two liquids, but rather to extend to all pairs of immiscible liquids having different relative densities, so that gravity borne phase differentiation be timely enabled.

The separator box-like main frame 22 includes a bottom flooring 40 (FIG. 3), the two lateral side walls 30, 32, a top wall 42 (FIG. 1), a rear wall 44 (FIG. 2) and a front wall 46 (FIG. 3), wherein an enclosure 48 (FIG. 4) is formed. Enclosure 48 is in fluid communication with the large body of water W outside of main frame 22, through one oil rich solution front intake port 50 (arrows Wa in FIG. 8) made in front wall 46, and two front and rear water outlet ports 52, 54, respectively (arrows Wb and Wc respectively in FIGS.

8 and 7) made in front and rear walls 46, 44. Preferably, an additional water rich solution front outlet port 56 (FIG. 8) is provided to front wall 46 above front water outlet port 52, for attachment by an elbowed outlet pipe 108 of which more later. If no pipe 108 is provided, no outlet port 56 should exist, or else, port 56 should then be closed by a sealing plug 57 (FIG. 5).

As best shown in FIGS. 4–9 of the drawings, enclosure 48 of main frame 22 is subdivided into three inner chambers:
a) a first main frontward upward chamber 58, into which opens the oil rich solution front intake port 50 and the optional water rich solution outlet port 56.
b) a second rearward upward chamber 60 (FIG. 9); and
c) a third downward chamber 62, extending beneath the first and second chambers 58 and 60 and into which opens water outlet port 52.

Figure 5:
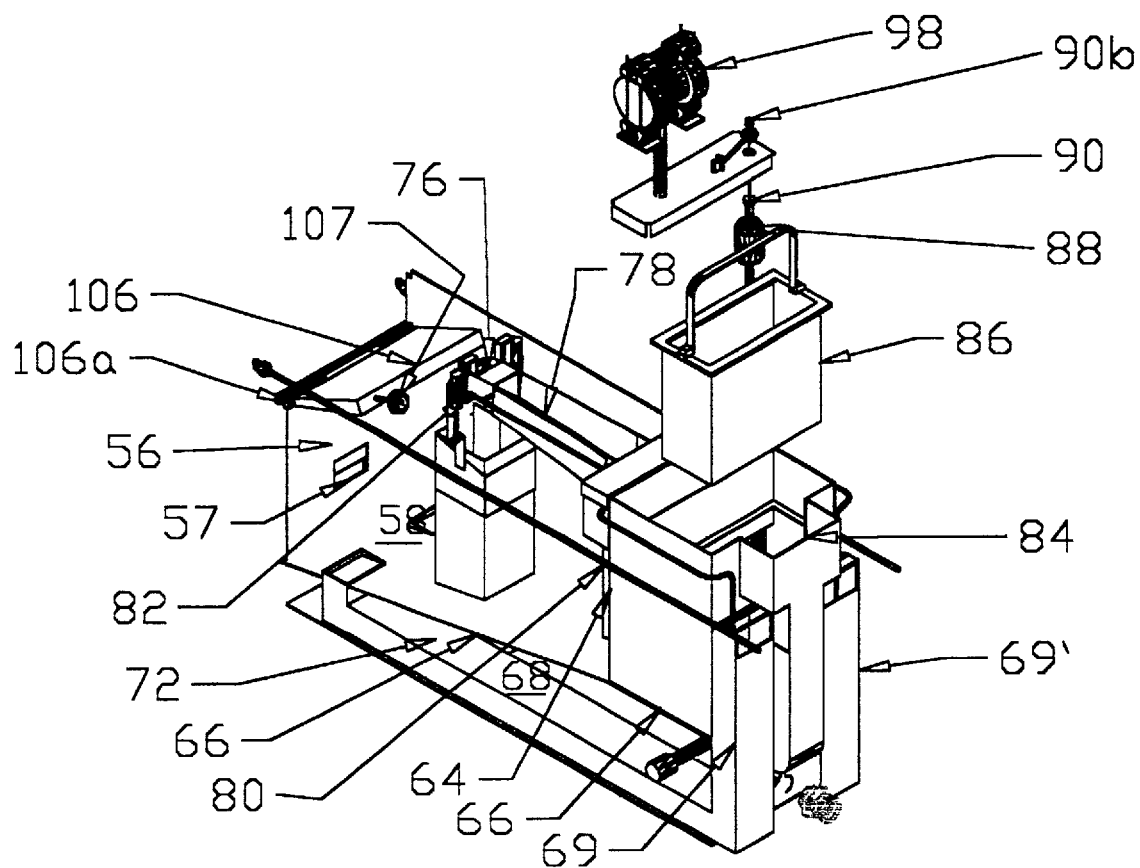
FIGS. 5 and 6 are partly exploded perspective views of the water vessel of FIG. 4, from the rear and front ends respectively thereof.

As shown in FIG. 5, inner chambers 58 and 60 are spaced by a vertical partition wall 64, whereas inner chambers 58 and 52 are spaced by an upwardly rearwardly inclined partition wall 66. As further shown in FIG. 7 and suggested by the phantom lines in FIGS. 5 and 6, inner chamber 58 is in fluid communication with rear water outlet port 54 by a pair of spaced bottom opposite lateral tubular conduits 68, 68', extending in a front to rear direction against bottom wall 40 and opening at their front ends 68a through an opening in sloped flooring 66, and extending through the bottom portion 44a of rear wall 44 to connect to a pair of laterally spaced vertical pipe 69 that upwardly open at water outlet port 54.

It is understood the solution and the water from the large body of surrounding water, are free to circulate through this open frame, in a flow through fashion.

Figure 7:
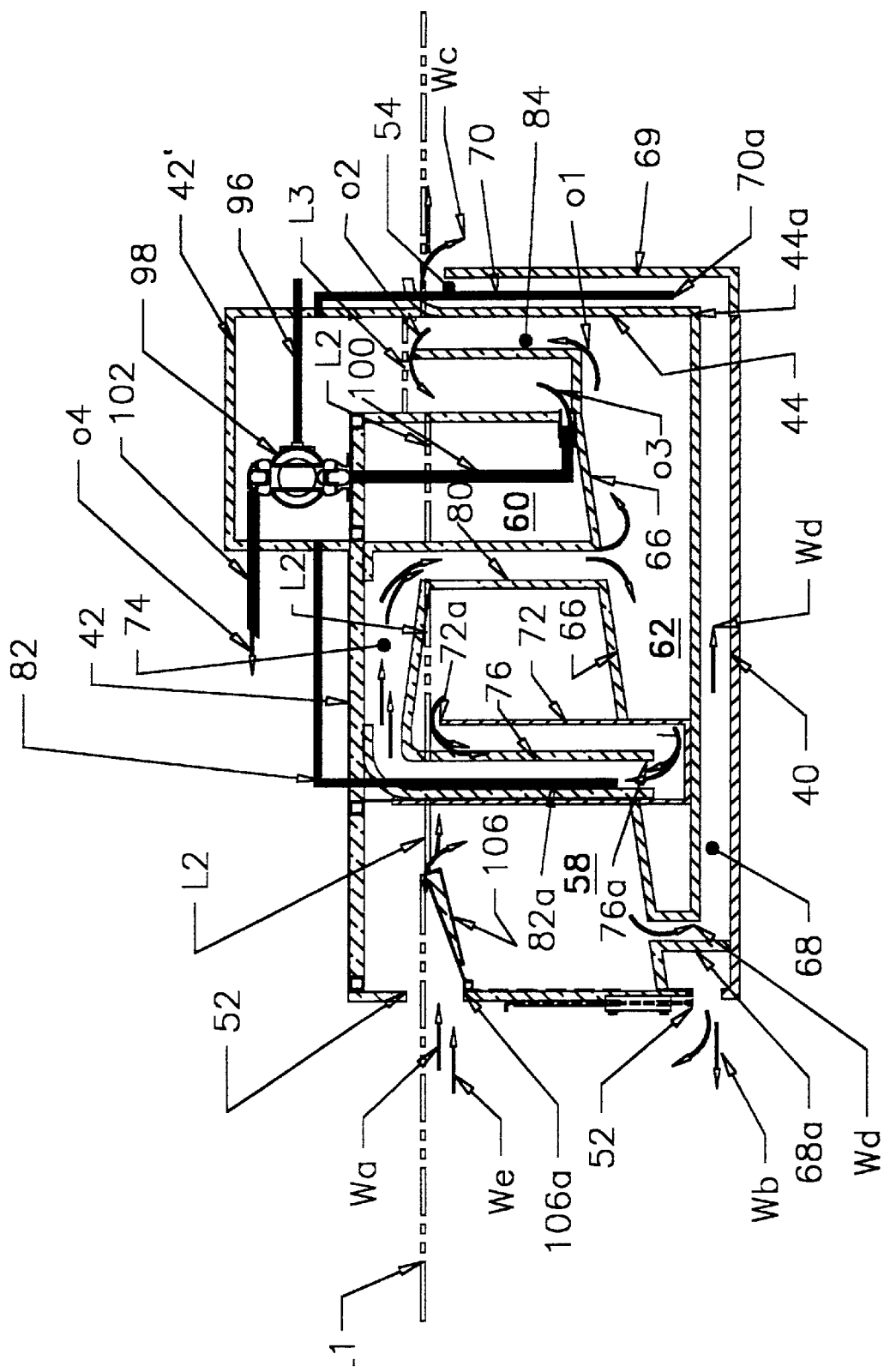
FIG. 7 is a vertical schematic sectional view of the water vessel of FIG. 2, suggesting with the arrows the flow of oil/water solution, and of separated oil and separated water.
Figure 8:
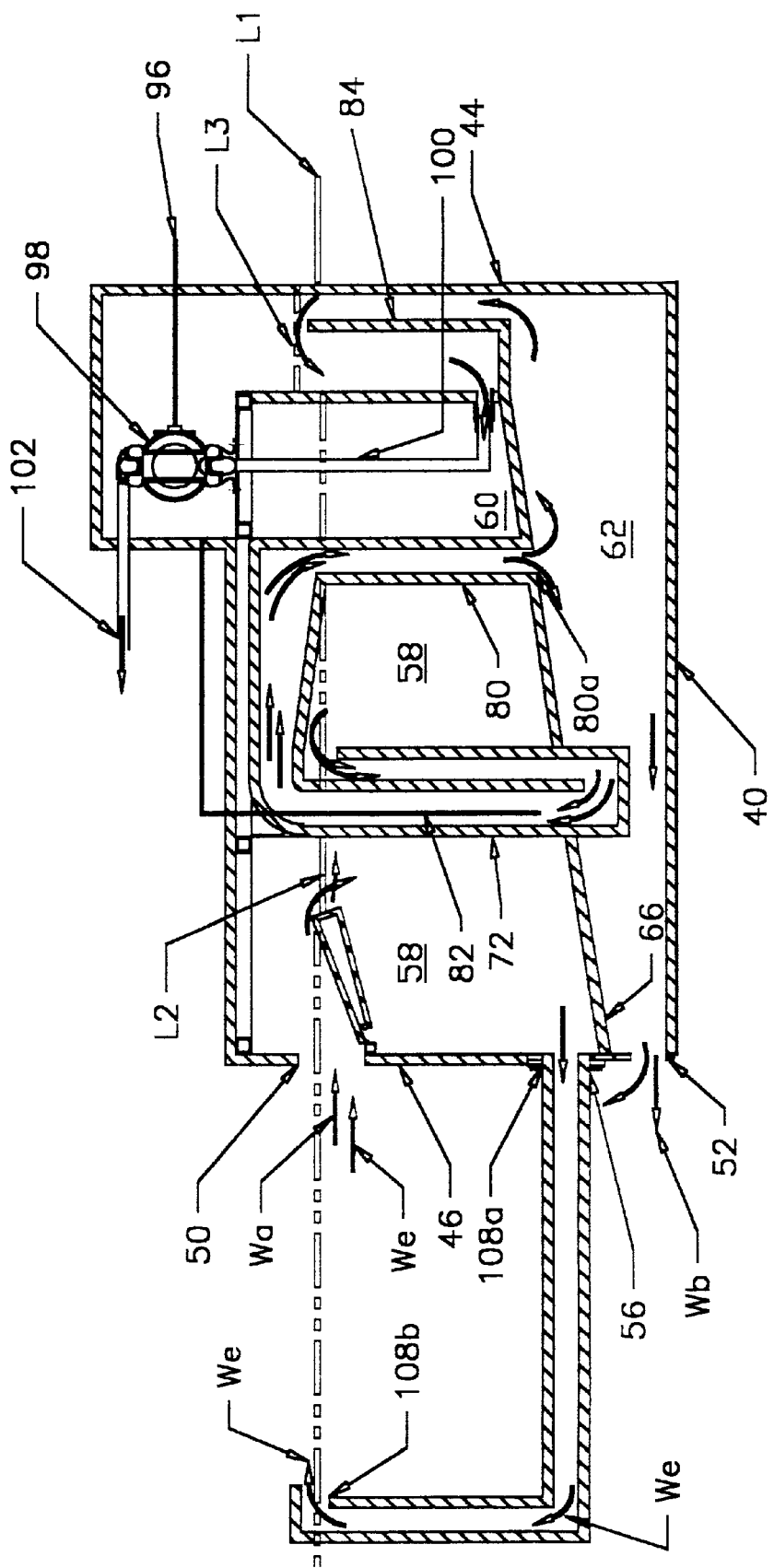
FIG. 8 is a view similar to FIG. 7 but the section being made along a plane transversely offset to that of FIG. 7, and also showing the frontward tubular extension of FIG. 1 for forward escape of separated water to the large body of water.

According to the teachings of the invention, a pressurized air line 70 is provided, having an air output nozzle end portion 70a extending through rear water outlet port 54 and downwardly therebeyond into vertical pipe 69 but stopping short of the horizontal water escape conduits 68, 68' (see FIG. 7). Therefore, air outlet nozzle 70a is located above water conduits 68, 68'. Pressurized air line 70 may have for example 100 pounds per square inch rating, with pressurized line 70 having an inner lumen diameter of about ⅜th of an inch and with outlet tube 69 having an inner lumen diameter of about 4 inches for best performance.

In operation, as pressurized air is fed to line 70, air bubbles are formed at the downstream nozzle end 70a thereof, so that the water therebeneath in vertical column 69 is brought upwardly with the air bubbles. Rapidly, this pressurized air induced suction at the downstream end of the separator apparatus liquid network, creates a water level depression at the upstream end of the separator apparatus liquid network, namely, within chamber 58, to depressed water level L2. As this lower level water level L2 in front chamber 58 is vertically downwardly offset relative to the large body of water level L1, surface water flow is triggered to "fill" the main chamber 58 by the solution flowing through solution intake port 50. Therefore, automatic migration of the liquid surface pollutant will occur toward and into machine 22 through front intake port 50. If the buoyancy value of floats 24, 26, has been carefully defined so that the water lines L1 and L2 both extend through front solution intake port 50 and above rear water outlet port 54 (FIG. 7), this front to rear water flow through the separator frame 22 will sustain itself, as suggested by the arrow Wd in FIG. 7. The suction pull at the front of the buoyant machine 22 may be for example 5 pounds per square inch (5 lbs/in2).

According to the specific teachings of the invention, there is further provided inside chamber 58 an overflow tank 72. Tank 72 extends at its bottom end through and beyond inclined flooring 66, but short of bottom wall 40. Tank 72 includes a top mouth 72a and is of such a length as to be adapted to be submerged i.e. to come slightly under solution level L2, so that progressive solution overflow from the chamber 58 into the tank 72 will occur under the liquid flow induced by downstream air line 70. A bevelled buoyant collar 73 (FIG. 10) is slidably mounted around tank top mouth 72a, with a first front side 73a extending above water level L2 in register with front intake port 50, and with a second opposite side 73b extending slightly below water level L2. Buoyant collar 73 is destined to work in cooperation with buoyant gate 106 in accelerating surface oil overflow into upright tank 72.

Figure 6:
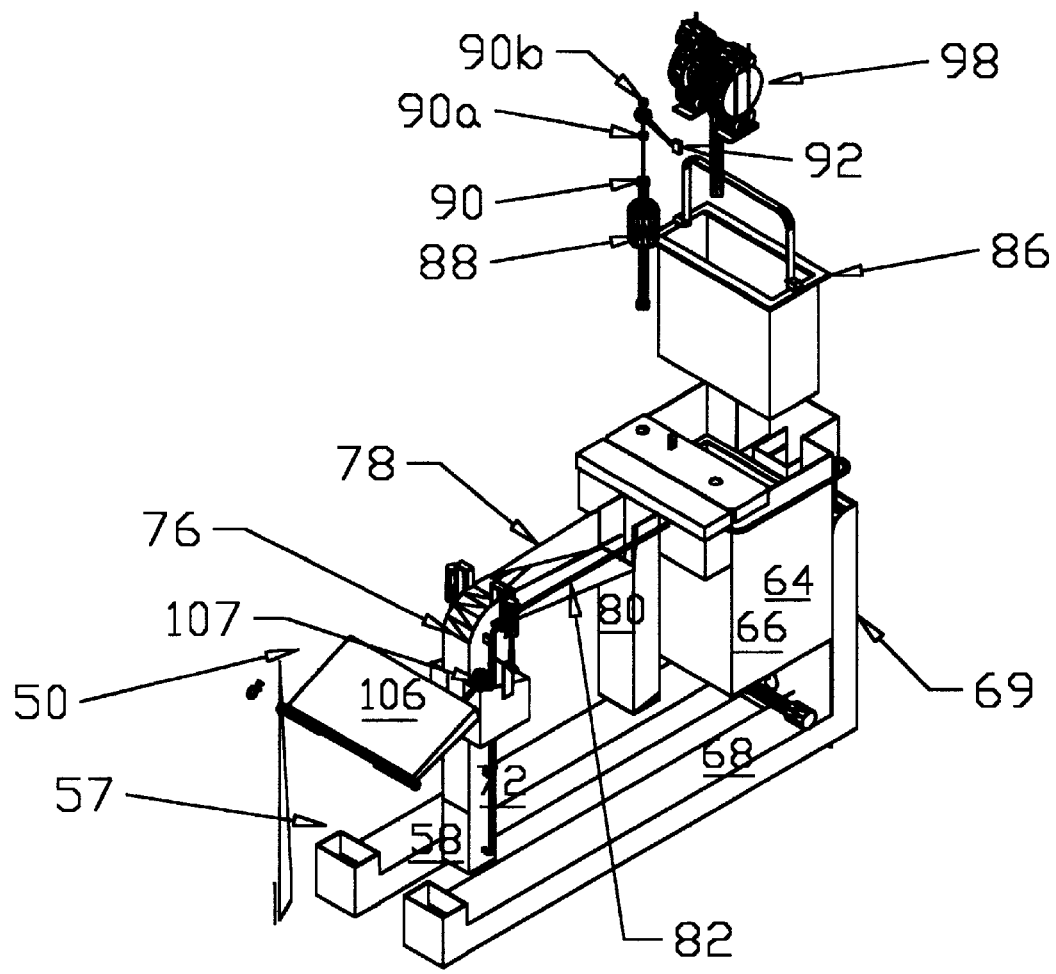

One vertical leg 76 of an inversely U-shape pipe 74 is fitted through mouth 72a and into tank 72. Leg 76 is of such a length that its bottom, preferably bevelled mouth 76a is located beneath the level of the adjacent section of inclined flooring 66, and spacedly above the bottom wall 72b of tank 72. The generally horizontal tubular top web leg 78 extends spacedly above water levels L2, and includes either a few top air-circulation perforations 78a (FIG. 10), or be completely open at its top face (FIGS. 5–6). The other vertical leg 80 opens at its bottom end mouth 80a into lower chamber 62.

In view of the relative size and positions of tank 72 and U-pipe assembly 74, the oil rich solution that engages in overflowing fashion into tank 72 will build up in the pipe leg 76 to a height greater than water level L2, so as to automatically engage into the top transverse web 78 of this pipe assembly 74, and thereafter fall down along the downward rearward slope of web pipe 78 and through vertical rearward outlet pipe 80 into the underlying oil separation chamber 62. This oil rich solution transfert from front chamber 58 to intermediate chamber 62 occurs automatically under the communicating vessel principle, as well known to those skilled in the art. No special fluid flow biasing means is required to maintain this fluid flow between chambers 58 and 62, via tank 72 and U-pipe arrangement 74, other than the pressurized air ligne 74 which creates and maintains water flow from the front surface water intake port 50 to the rear surface water outlet port 54.

Preferably, and in order to accelerate the oil rich solution flow rate through the U-shape pipe system 74 in conditions of heavy oil spill contamination, and to also accelerate water outflow from chamber 62 through front outlet port 52, a second pressurized air line 82 may be brought into pipe leg 76, with the air outlet nozzle thereof 82a located short of and above the lower mouth 76a of pipe leg 76. Under the same water displacement principle as for downstream rearward tube 69, the solution that builds up by overflow from chamber 58 into tank 72 will be sucked into pipe system 74 by the air bubbles thus generated by pressurized air line 82, to rove upwardly along vertical pipe leg 76, through transverse rearwardly downwardly inclined web leg 78, and downwardly along vertical pipe leg 80 into chamber 62. Importantly, the air from the air bubbles moving upwardly along pipe 76, is allowed to escape upwardly through the air breathing perforations 78a of the web leg 78, so that only oil rich solution is allowed downwardly along pipe leg 80.

This solution engaged into lower chamber 62 will progressively separate into a high density water phase, which with sink onto bottom wall 40 and then escape through front water outlet port 52, and a low density oil phase, which will rise against the underface of inclined partition wall 66 and move rearwardly upwardly along the slope of wall 66, until it reaches third upper rearwardmost chamber 60.

Figure 9:
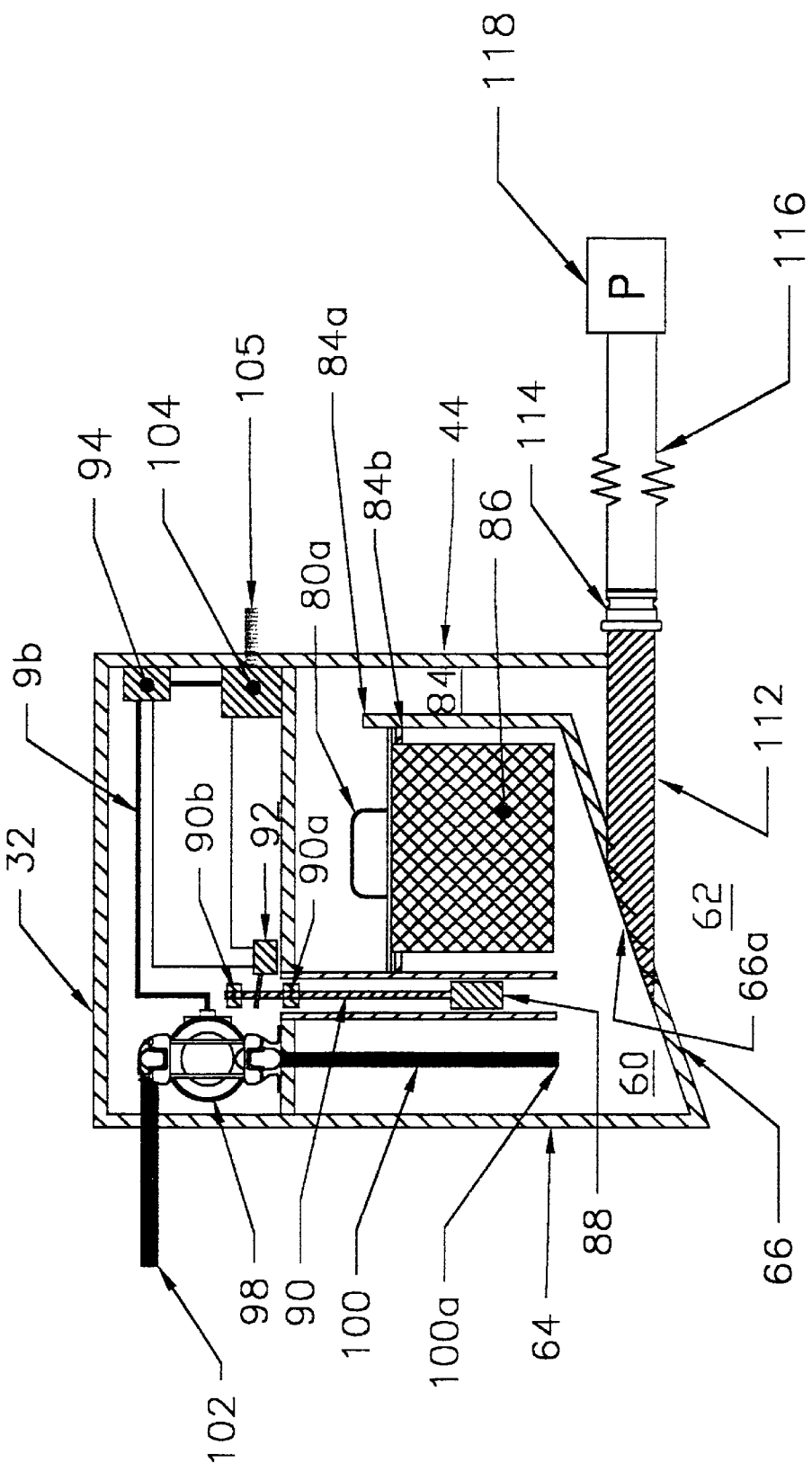
FIG. 9 is an enlarged more detailed view of the right-hand side section of FIG. 7, illustrating the air pump operation to return separated reclaimed oil to an external storage tank.
Figure 10:
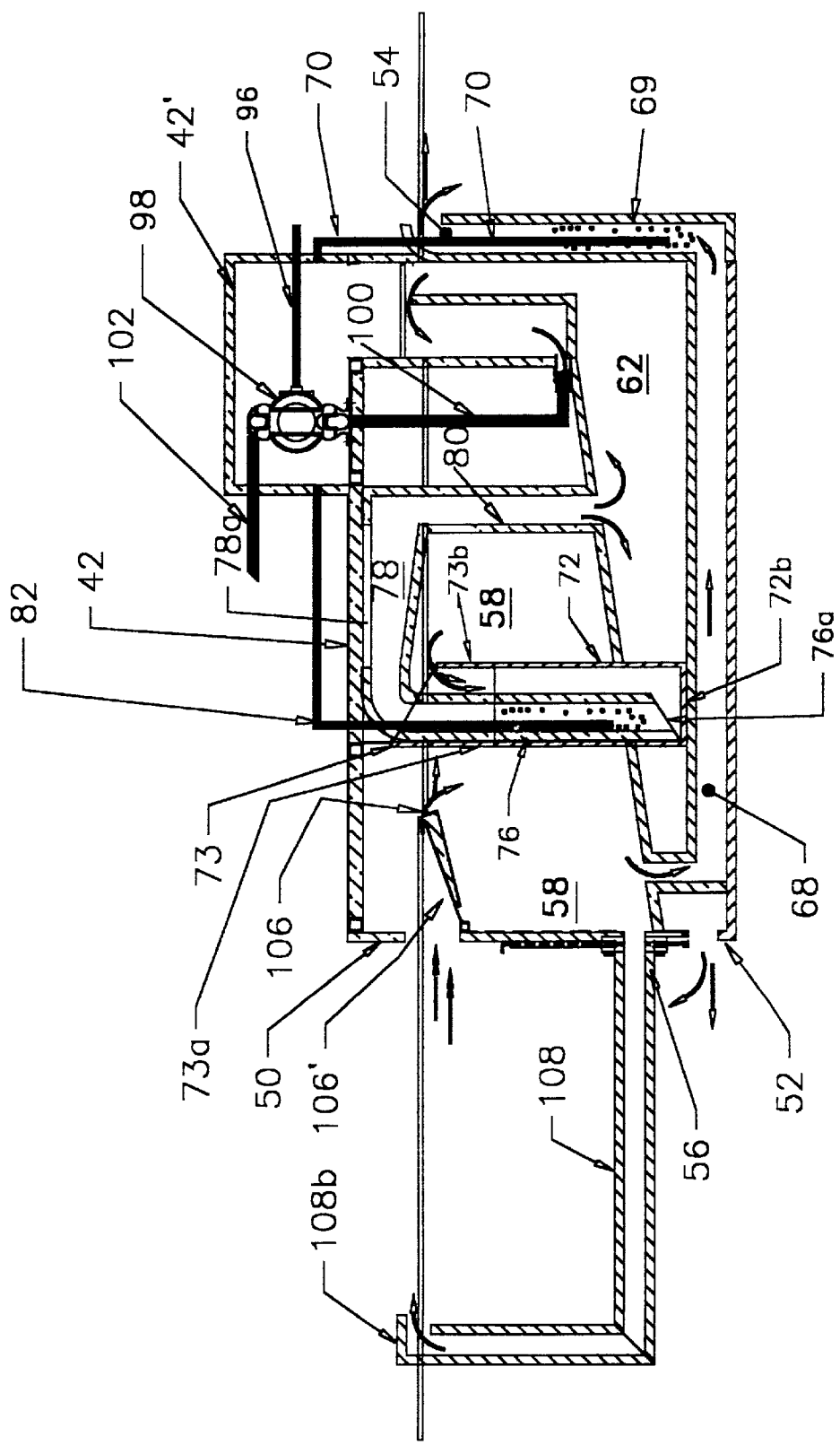
FIG. 10 is a view similar to FIG. 7, but including the frontward tubular water escape extension.

Chamber 60 is best shown in FIGS. 7 and 9. Oil chamber 60 is physically separated from lower chamber 62 by the rearwardly upwardly sloped rear end portion of partition 62, and by vertical duct 84 extending in between the pair of spaced upright water outlet ducts 69, 69', adjacent rear wall 44. A column of oil rich solution will build up in upright duct 84, along arrow O1, so that again through overflow, the top (lowest density) oil layer of oil rich solution will eventually pour from the top mouth 84*a* of vertical duct 84 into chamber 60 along arrow O2.

It is noted that the oil line L3 to the level of which the oil column inside upright pipe 84 is allowed to rise, is upwardly offset relative to the water ligne L1 of the main body of water W, as can be expected under the communicating vessel principle by those skilled in the art.

The oil will therefore be allowed to build up inside upper chamber 60. Preferably, a filter basket 86 is mounted into chamber 60, spacedly above flooring 60, and adjacent to and depending from a seat 84*b* of duct mouth 84*a*, to intercept macroparticulate debris. As the oil level increases, a float ball 88 (similar to that of a WC tank) correspondingly raises, until a given threshold level 90*a* is reached where the trip lever 90 carrying the float ball 88 triggers an on/off switch 92. This switch 92 then releases an air control valve 94 to a pressurized line 96 (connected to an air compressor unit) and that is connected to a lift and force oil pump 98. Oil lift and force pump 98 is preferably mounted to the main frame 22 above chamber 60; but alternately the oil pump could be fitted externally (.e.g. being ground based) of vessel 20, as an oil suction pump 118 (FIG. 9), to replace the lift pump 98—of which more later.

The float ball and trip lever assembly 88, 90, protects the oil pump 98 (or 118) from damage in the case an air hose 96 would accidentally rupture, so that the oil pump would undesirably suck air instead of oil. Clearly, this is advantageous in that it relieves the maintenance crew from continuous and tedious manual supervision of the oil level inside oil basin 62.

An upstream suction hose 100 is operatively coupled to oil pump 98 and is adapted to first lift oil from chamber 60 through its bottom mouth 100*a* located at a distance from the lower registering wall section 66 of chamber 60 (arrows O3 in FIG. 7), up to pump 98, and then forcibly expel this oil through a downstream discharge hose 102 (arrows O4 in FIG. 7) for storage into a storage tank (not shown) located externally (e.g. ground based) of the vessel 20, until the oil level inside chamber 60 drops to a second lower threshold level 90*b*.

The vessel intermediate casing top wall 42 is raised at its rear end portion 42', to accommodate the large size of pump 98.

At that point in time, the on/off switch 92 is once again automatically triggered to close valve 94, and thus to stop oil pump 98. No labour supervision is required, as all this is performed automatically.

It is readily understood that there is cyclical (on/off, on/off, ...) operation of the lift and force oil pump 98, only when the oil build up inside oil column 60 cyclically exceeds the set threshold. Therefore, as the oil spill at the surface of water ligne L1 above the main water body becomes eventually depleted, the lift and force oil pump 98 will permanently stop, since no further oil will build up into column 60. Since positively no water is ever allowed inside chamber 60, due to the differential density ratio and the use of a panel array under the communicating vessel principle, the pump 98 will always remain inoperative when the oil spill has been completely removed from the water surface L1, although some oil will remain at the bottom of the chamber 60 inside the vessel main frame 22. Consequently, there is no possibility of accidentally damaging the oil pump 98 under vacuum borne pump wear out due to improper or careless human supervision, since it automatically shuts down before air can undesirably enter the upstream suction hose 100. Intake hose 100 may have an inner diameter of one inch, while outlet hose may have an inner diameter of ¾ of an inch.

Such selector box 104 could vary the air injection to each air ligne 70, 82, 96, accordingly to parameters collected by appropriate on board sensors (not shown), responsively to the instantaneous value of contaminant oil remaining on the large body of water (e.g. intermediate air ligne 76 operates at the initial clean-up stage, but is deactivated when most of the surface oil has been collected).

Preferably, activation of one, two or all three pressurized air lines 70, 82 and 96 are all coordinated via a single selector box 104 fed by a main pressurized air line 105. Selector box 104 may be remote controlled externally from the vessel 20.

It is further understood that filter basket 86, by filtering macroparticulate debris, prevents same from accumulating at the bottom of chamber 60 and eventually clogging the bottom mouth 100*a* of oil intake hose 100, and thus again preventing accidental oil pump wearing out under vacuum operation. This filter basket 86 is deemed optional in marine environments having few or none macroparticulate debris floating on the surface of the large body of water W, but becomes almost a prerequisite to prevent expensive damages beyond repair of the oil pump if not constantly monitored by maintenance crews if the marine environment is heavily contaminated by macroparticulate debris beyond the oil spill per se. Basket 86 preferably includes a top handle 86*a* to facilitate handling thereof when collected debris is to be hand removed by maintenance crews.

It is understood that with the present oil separator and reclaiming apparatus 20, there is no need to displace the vessel 20 along the surface of the large body of water, for the apparatus to be able to reach out for the oil spill. Indeed, this vessel is intended to be operated in a stationary and completely automatic fashion. Instead of moving about the apparatus along the surface of the body of water, a fore and aft flow of water is induced by the air bubble forming pressurized air line 70 through the apparatus 22 so that it is the water that moves relative to the vessel and not the vessel relative to the water body. The solution is progressively concentrated in oil by successive steps through the communicating vessel principle with gravity borne phase separation, including the second oil-rich solution flow generated by the second pressurized air line 82, to eventually reach the oil only chamber 60.

It is envisioned to limit use of the water outlet port 52, only when heavy oil contamination is present as evidenced by a thicker surface layer of oil above the large body of water.

Preferably, a buoyant gate 106 is pivotally mounted at 106*a* to the lower edge of solution intake port 50. Gate 106 follows the water level of water line L1, and furthermore bridges the vertical gap generated between solution levels L1 and L2, as fore and aft fluid flow is generated through vessel 22 by pressurized air line 70, to accelerate oil rich solution flow into chamber 58 for engagement into oil rich solution tank 72. An adjustable weight rod 107 is provided to and extend away from the rearward free end of gate 106, to adjust the relative inclination thereof as illustrated in dotted lines and in full lines respectively by the play of FIG.

10 as 106, 106'. Front gate 106 biases surface oil toward oil container 72, while resisting downward flow under suction forces generated by rear pressurized air line 70. Gate 106 also works as a backflow preventing gate, to prevent accidental backflow of oil contaminated surface water when rear air ligne 70 is deactivated and water flow through the machine 22 is consequently stopped.

It is noted that the funnel shape arrangement provided ahead of vessel 20 by the bevelled edges 24c, 26c, of extended buoyancy members 24, 26, promotes 90 degree sector water collection range ahead of the vessel 20, under the water flow induced through vessel frame 22 by rear pressurized air lines 70, 70. Such a wide spectrum of water access for surface water intake port 50 should create small scale whirpool effects that will draw surface water located laterally and eventually rearwardly from the vessel, toward the front of vessel 20 for full treatment of the large body of water W.

Preferably, an elbowed water rich solution outlet pipe 108 is further provided ahead of vessel 20, being coupled at its inner end 108a to the outlet port 56 made in front casing wall 46 above outlet port 52, extending through the large body of water ahead of vessel 20, and opening at its outer end mouth 108b to the water ligne level L1 in spaced register with front solution intake port 50, for return to the present oil separating apparatus. As suggested by the blue arrows We in FIG. 8, the water rich solution escaping through outlet port 56 from the higher density solution layers sliding downwardly forwardly over sloped flooring 66.

It is thus understood that the present machine 22 is permanently connected to ground (or to a nearby vessel) by at least two hoses:
a) the oil collecting hose 102 (and /or 114); and
b) the air injector hose 70 (optional hose 82 may be further added).

An optional improvement would be to provide means 110 for fitting the present separator apparatus to a ground based force pump. Such means 110 are schematically illustrated in FIGS. 1, 2, 5 and 9 of the drawings and would include a pipe 112 extending through an aperture 66a made into the floring section 66 of oil chamber 60, and opening into chamber 60 beneath and in register with the upstream oil loading mouth 84b of chamber 60. Pipe 112 would in turn extend horizontally through rear wall 44 and connected to a quick coupling 114 at the back of vessel casing 22. An elongated hose 116 (e.g. having a diameter of 3 inches) would then releasably interconnect coupling 114 to a ground-based (or alternately mounted into another separate vessel) suction only oil pump 118. There would still be use for preferably having the float ball 88 and trip level 90 assembly mounted inside chamber 60 as when the lift and force pump 98 was used, to prevent accidental vacuum borne wear-out of the ground based suction only oil pump 118. It is further noted that this ground based suction only oil pump 118 and thelift and force pump 98 need not be mutually exclusive in their operation, since both could work in concurrent fashion if desired. Such concurrent operation of the two pumps 98, 118 would be envisioned to be particularly useful in case of heavy oil spill contamination at the surface of the main body of water, or when faster oil spill clean-up is required.

An important feature of this machine 22 is therefore that the reclaimed oil pumped in from oil chamber 62 is 100% hydrocarbon. Unexpectedly, there is no water remaining even in trace amounts inside chamber 62, due to the very efficient construction of the machine 22. This feature therefore substantially decreases shipping and treatment costs of contaminated waters. Moreover, even though the water decontaminated by this machine 22 and returned to the body of water still carries noticeable trace amounts of oil, this partly decontaminated water is of sufficiently good quality to meet or exceed current environmental regulatory values for release to the nature.

I claim:

1. An oil separating buoyant surface vessel for separating oil from surface water level from a large body of oil-contaminated water and for economically reclaiming this oil, said vessel destined to operate in stationary fashion on the water surface and comprising at least one buoyancy member and a liquid flow-through separator rigid open frame integral to said buoyancy member and destined to be maintained in partly submerged condition in water, said separator frame comprising:

a first oil contaminated water collection chamber having a front surface water intake port, a rearwardly upwardly inclined submerged flooring, and at least one first channel member extending to a rear surface water outlet port for free water flow between said water intake port and said rear water outlet port;

a second oil accumulating chamber located rearwardly of said first chamber;

a third submerged separator chamber located beneath said first and second chambers and having a second channel member, extending to a front submerged water outlet port, a third arcuate channel member, extending through said inclined flooring into said first chamber for fluid communication between said first and third chambers, an intermediate section of said third channel member extending spacedly over water line, and a fourth upright channel member, extending through said inclined flooring and opening at its top end mouth into said second chamber for fluid communication between said second and third chambers, said top end mouth of said fourth channel member being located spacedly over water line;

a powered fluid flow system for providing continuous front to rear liquid flow through said device; and an upright overflow tank, having a closed bottom end extending through and beyond said inclined flooring, and a top open mouth extending at water line, with one leg of said third arcuate channel member extending through said upright tank top open mouth and into said upright tank, said third channel member one leg defining a bottom mouth located beneath said first chamber inclined flooring;

wherein under the communicating vessel principle, oil rich water overflow occurs between said first chamber and said upright overflow tank through said upright tank top mouth, and oil overflow occurs between said fourth channel member and said second chamber through said fourth channel member top mouth; said second chamber having an access area for collecting the oil accumulating therein;

wherein once the large body of water has been decontaminated, liquid overflow automatically stops between said fourth channel member and said second chamber, so that accidental entry of water into said second chamber is prevented throughout operation of said oil separating vessel.

2. An oil separating surface vessel as in claim 1, wherein said powered fluid flow system is a pressurized air line, coupled to a power source and feeding pressurized air to a submerged rearward end portion of said first channel member, wherein a fore and aft suction is generated into said first channel member, said fore and aft suction generating and maintaining water flow from the large body of contaminated water, through said front water intake port and into said first chamber, through said first channel member and outwardly through said rear water outlet port; and further including a second pressurized air line, coupled to a power source and extending through said upright tank top mouth and into said third channel member one leg short of said third channel member bottom mouth; wherein said second pressurized air line generates a fore and aft suction into said third channel member, the latter fore and aft suction accelerating oil rich water flow from said upright tank into said third chamber and also accelerating water outflow from said third chamber to said front water outlet port.

3. An oil separating surface vessel as in claim 1, further including a buoyant planar gate, mounted for relative movement to said front surface water intake port, said buoyant gate accelerating oil rich water flow through said front water intake port to said upright tank top mouth.

4. An oil separating surface vessel as in claim 3, further including an adjustable weight member, carried by said buoyant planar gate for adjusting the relative orientation of the planar gate depending on the selected water flow rate generated by said powered fluid flow system.

5. An oil separating surface vessel as in claim 1, further including a second front water outlet port, opening into said first chamber adjacent the front end of said first chamber inclined flooring, and an elbowed pipe member, coupled at its inner end to said second water outlet port, and extending in submerged condition and opening at its opposite outer end mouth to water line, said elbowed pipe member outer end mouth being located spacedly ahead of and in register with said front surface water intake port.

6. An oil separating surface vessel as in claim 1, further including a lift and force air pump, mounted to said open rigid vessel frame and coupled to a pressurized air supply power source, an oil intake hose, connected at its inner end to said pump and its bottom end mouth opening into a lower section of said second chamber, and an oil discharge hose, fluidly interconnecting said pump to a remote oil reclaiming location, wherein oil in said second chamber is removed therefrom and propelled outwardly from said surface vessel to the remote oil reclaiming location.

7. An oil separating surface vessel as in claim 1, further including a remote suction air pump and an oil intake hose member, extending through said second chamber and fluidly interconnecting said second chamber to a remote oil reclaiming location, wherein oil in said second chamber is removed therefrom and propelled outwardly from said surface vessel to the remote oil reclaiming location.

8. An oil separating surface vessel as in claim 6, further including an oil level float ball and trip lever assembly, operatively connected to said lift and force pump and sensitive to oil level variations in said second chamber for cyclical on/off operation of said lift and force pump responsive to fluctuations of oil levels between lower and upper oil level limits.

9. An oil separating surface vessel as in claim 7, further including an oil level float ball and trip lever assembly, operatively connected to said suction pump and sensitive to oil level variations in said second chamber for cyclical on/off operation of said suction pump and responsive to fluctuations of oil levels therein between lower and upper limit oil levels.

10. An oil separating surface vessel as in claim 2, further including:

a lift and force air pump, mounted to said open rigid vessel frame and coupled to a pressurized air supply power source, an oil intake hose, interconnecting said pump and said second chamber, and an oil discharge hose, fluidly interconnecting said pump to a remote oil reclaiming location, wherein oil in said second chamber is removed therefrom and propelled outwardly from said surface vessel, to the remote oil reclaiming location;

a remote suction air pump and an oil intake hose member, extending through said second chamber and fluidly interconnecting said second chamber at its inner end to a remote oil reclaiming location at its outer end, wherein oil in said second chamber is removed therefrom and propelled outwardly from said surface vessel to the remote oil reclaiming location; and an oil level float ball and trip lever assembly, operatively connected to both said lift and force pump and said suction air pump and sensitive to oil level variations in said second chamber for cyclical on/off operation of said lift and force pump and of said suction pump and responsive to fluctuations of oil levels between lower and upper oil level limits.

11. An oil separating surface vessel as in claim 8, further including a filter basket, mounted into said second chamber intermediate said oil intake hose bottom end mouth and said fourth channel member top end mouth.

12. An oil separating surface vessel as in claim 10, further including a filter basket, mounted into said second chamber intermediate said oil intake hose bottom end mouth on the one hand, and said fourth channel member top end mouth and said suction air pump oil intake hose member inner end mouth on the other hand.

13. An oil separating surface vessel as in claim 10, further including an air line control box, operatively connected to said pressurized air lines and to said air supply power source, for coordinating the operations thereof.

14. An oil separating surface vessel as in claim 2, wherein there are two said buoyancy members carried on opposite sides of said main rigid open frame, the front end of each said buoyancy member being inwardly bevelled, so that a front funnel shape jaw is formed by the front ends of said buoyancy members;

wherein water whirpool effects are generated ahead of said surface vessel by the suction borne fore and aft water flows generated by said pressurized air lines, which accelerates the oil spill clean-up required time line.

15. An oil separating surface vessel as in claim 14, wherein said pair of buoyancy members are pivotally mounted to said main rigid frame for pivotal motion between an extended operative condition, extending along the water line away from said main rigid frame for oil separation operations, and a retracted inoperative condition, extending against said main rigid frame for moving about said vessel on the surface when not in operation.

16. An oil separating surface vessel as in claim 3, further including a buoyant collar member, slidingly carried around the top end mouth of said upright tank, said collar member being rearwardly bevelled with a front raised wall, in register with said buoyant planar gate and extending above water line, and a rear depressed wall, opposite said front raised wall and extending slightly below water line.

17. An oil reclaiming device for use on the surface of a main body of oil contaminated water, said device comprising:

a) a first front collection chamber, having a top contaminated water surface intake port, a rearwardly upwardly inclined flooring, and a submerged first water outlet;

b) a second waterless oil accumulation chamber, located rearward from said first chamber, and having an access for economic oil reclaim outside of said device;

c) a third submerged separation chamber located beneath said first and second chambers and having a second water outlet;

d) a first overflow and vessel communicating tubular assembly, fluidly interconnecting said first and third chambers;

e) a second overflow tubular assembly, fluidly interconnecting said second and third chambers; and f) a powered fluid flow system for providing continuous front to rear liquid flow through said device;

wherein water is prevented from engaging into said second chamber, both during oil clean-up of the main body of water and after clean-up thereof has been completed, so that waterless oil can be reclaimed from said second oil accumulation chamber at all stages of operation of said device.

* * * * *

UNITED STATES PATENT AND TRADEMARK OFFICE
CERTIFICATE OF CORRECTION

PATENT NO. : 6,159,361

DATED : December 12, 2000

INVENTOR(S) : Bernard Lapointe

It is certified that error appears in the above-identified patent and that said Letters Patent is hereby corrected as shown below:

On the Title Page, insert Item [54] Title should read ----- OIL-RECLAIMING BUOYANT APPARATUS -----.

Signed and Sealed this

Twenty-ninth Day of May, 2001

Attest:

NICHOLAS P. GODICI

Attesting Officer

Acting Director of the United States Patent and Trademark Office